United States Patent
Marshall et al.

[15] 3,675,780
[45] July 11, 1972

[54] FILTER DEVICE

[72] Inventors: Robert A. Marshall, 15 Jackson Street, Lynn, Mass. 01902; Howard J. Barach, 7 Maple Circle, Marblehead, Mass. 01945

[22] Filed: Sept. 25, 1970

[21] Appl. No.: 75,345

[52] U.S. Cl. ............................................210/446, 210/495
[51] Int. Cl. ...................................B01d 31/00, B01d 29/04
[58] Field of Search......................210/455, 22, 23, 321, 482, 210/495, 501, 500, 446

[56] References Cited

UNITED STATES PATENTS

| 3,506,130 | 4/1970 | Shaye | 210/446 X |
| 3,526,588 | 9/1970 | Michaels et al. | 210/23 |
| 3,488,768 | 1/1970 | Rigopulos | 210/23 |

*Primary Examiner*—Frank A. Spear, Jr.
*Attorney*—William L. Baker

[57] ABSTRACT

A compact device for filtering microorganisms such as bacteria from water or other liquid containing the same has a generally flat, envelope-type structure wherein the envelope is divided into a liquid-receiving upper chamber and a lower filtrate-receiving chamber by a flexible microporous membrane.

3 Claims, 3 Drawing Figures

PATENTED JUL 11 1972　　　　　　　　　　　　　3,675,780
FIG. 1
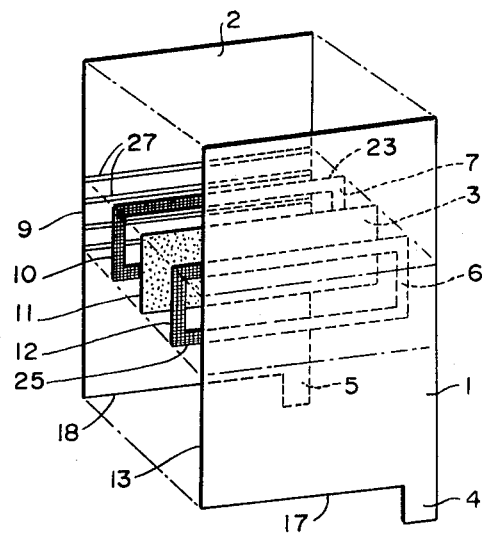
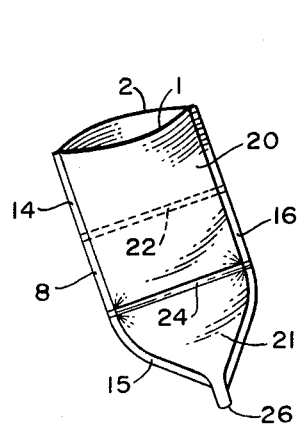
FIG. 3
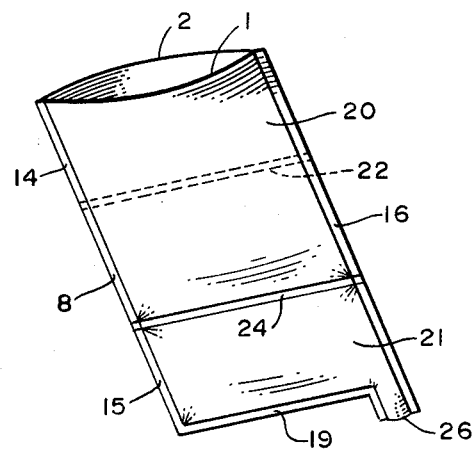
FIG. 2
INVENTORS
ROBERT A MARSHALL
HOWARD J BARACH
BY
*William L. Behn*
ATTORNEY

FILTER DEVICE

This invention relates to a device for treating liquids. More particularly, this invention concerns a device for filtering water or other liquid contaminated with microorganisms to remove such microorganisms, which device is normally flat, flexible and easily compacted.

In many instances in locations distant from a supply of potable water, a simple, efficient manner of converting non-potable, harmful microorganism-containing water to water suitable for drinking is desired. Quite often, for instance in the case of military personnel or civilian campers, a method which does not involve provision at the outset of bulky or heavy implements would be of the utmost desirability.

To fulfill such desires, and, indeed, necessities in the case of emergencies, tablets have been made available particularly for the military which destroy harmful microorganisms such as bacteria in non-potable water. However, while effective in killing harmful bacteria and in meeting the requirement of being light in weight and easily storable, the tablets have not gone without criticism. Although the tablets destroy living bacteria they do not remove the organic residue. Also, the tablets require regulation of the amount of water to which they are added in order to be effective. Moreover, the tablets do not remove suspended debris in the water such as fine dirt particles or unpalatable slime, etc.

The present invention provides a device for easily removing harmful microorganisms from unpotable water or other liquid containing the same, which device is flexible, lightweight, and highly compactable. The device entirely removes the harmful microorganisms in the water, requires no metering or measuring on the part of the user and also removes unpalatable suspended debris present in the impure water.

The present invention is most conveniently described with reference to the accompanying drawings illustrating a preferred embodiment of the device of the invention. The drawings should in no manner be considered limiting.

In the drawings,

FIG. 1 is an exploded, perspective view showing the device unassembled;

FIG. 2 is a perspective view of the assembled device of FIG. 1 in its expanded, operating condition;

FIG. 3 is a perspective view of the device of the invention in expanded, operating condition and having a conical-shaped lower chamber.

In FIG. 1, a generally flat, rectangular-shaped envelope is formed having a front wall 1 of flexible, liquid impermeable material, a rear wall 2 of flexible, liquid impermeable material and a microporous filter element 3 situated between the front and rear walls and lying in a plane which is parallel to the plane of the front and rear walls. Walls 1 and 2 have downwardly extending leg portions 4 and 5, respectively. A pair of frames 6 and 7 coextensive with filter element 3 are positioned respectively between the filter element and front wall 1 and between the filter element and rear wall 2. The frames each form a liquid impervious bond about their entire perimeter to the opposite side faces of filter element 3 and thereby support and strengthen the filter element. A common liquid-impervious bond 8 in FIGS. 2 and 3 is formed between side edge 9 of rear wall 2, side edge 10 of frame 7, side edge 11 of filter element 3, side edge 12 of frame 6 and side edge 13 of front wall 1. The bond continues between side edges 9 and 13 of the rear and front walls as shown at 14 and 15. The corresponding opposite side edges of the front and rear walls 1 and 2, frames 6 and 7 and filter element 3 are identically bonded as shown at 16. Bottom edges 17 and 18 of the front and rear walls form liquid impervious bond 19.

The envelope is divided into an upper chamber 20 and a lower chamber 21, by forming a liquid impervious bond 22 between the upper edge 23 of frame 7 and rear wall 2 and by forming a similar bond 24 between the lower edge 25 of frame 6 and front wall 1. Obviously the upper and lower chambers can be alternatively formed by bonding edge 23 to wall 1 and edge 25 to wall 2.

To prevent filter element 3 from sticking to the portion of rear wall 2 which forms one wall of the lower chamber 21, the interior of such portion can be made to have an irregular surface, 27 in FIG. 1, for example, an embossed surface. The same result can be obtained by embossing the surface of filter element 3 adjacent wall 2 but care must be taken not to unduly destroy the microporosity of the filter.

In operation, bacteria-contaminated water or other liquid is placed in the upper chamber 20 and allowed to pass through filter element 3, which is the only possible direction of passage, into the lower chamber 21. Passage of the water through the filter element can be hastened by simply squeezing or rolling the upper portions of walls 1 and 2 which define the upper chamber 20. Bacteria-free water is removed from lower chamber 21 through exit means 26, for example a Luer tip, formed by the leg portions 4 and 5 of walls 1 and 2.

Front and rear walls 1 and 2 may be of any flexible, liquid-impervious material. Thermoplastic polymeric sheet materials such as polyethylene and polyvinyl chloride are ideally suitable for use in forming the wall portions of the device since they can be heat sealed to form the requisite impervious bonds. Frames 6 and 7 not necessarily, but preferably, are formed of the same material.

Filter element 3 can be any microporous material having a pore size sufficiently large to permit passage of water molecules therethrough yet small enough to prevent passage of microorganisms. Flexible polymeric film rendered microporous by any of the well known techniques, for example, extraction of solid fillers or liquid non-solvents from the polymeric film are especially suitable due to their flexibility. Microporous membranes of cellulose acetate and acrylic polymers are well known in the art and generally employed as filters. In general, microporous materials having a pore size in the range of 0.2 to 0.45 micron are suitable for use in removing microorganisms in the device of this invention.

Particularly preferred for use as the filter element in this invention are reinforced microporous membranes of thermoplastic polymeric film materials such as microporous acrylic polymer films reinforced with a nylon mesh to impart strength thereto. Such membranes not only resist puncture by forced liquid therethrough but also can be heat-sealed to form liquid-impervious bonds with other thermoplastic materials.

The device of the invention can be assembled with a second filter, or pre-filter, to initially remove particles of suspended dirt, slime, etc., which could clog the fine pores of the microporous filter element. Wire or synthetic resinous screens of a relatively small mesh size are suitable for use as such pre-filters.

It is also possible to provide means to quickly test the proper functioning of the device prior to use. For instance means for depositing a pigment or dye having a particle or molecular size equivalent to that of the microorganisms to be removed in the upper chamber may be secured to the device. The upper chamber is then filled with liquid and a sample of the colorant released. In the event that the filter element is punctured or otherwise unsuitable for safe use, the pigment or dye will appear in the lower chamber of the device.

It is apparent that the aforedescribed device can be constructed with any desired dimensions or geometrical configuration.

It is claimed:

1. A normally flat, flexible, easily compacted liquid filtering device comprising an envelope defined by front and back wall portions of flexible, liquid-impermeable polymeric sheet material in generally superposed relationship; a flexible filter element comprising a flexible microporous sheet of thermoplastic polymeric material to which is bonded a supporting screen of synthetic resinous material, said filter element having a pore size in the range of 0.2 to 0.45 micron and being disposed between said front and back wall portions and being further disposed in a plane parallel to the plane of said wall portions, said filter element having upper, lower and side edges; a pair of hollow frames of flexible, liquid-impermeable polymeric sheet material each coextensive with said microporous sheet, one of said frames being disposed between said microporous sheet and said front wall, the other of said frames being disposed between said microporous sheet and said back wall, said upper edge of said filter element forming a liquid-impermeable joint with an upper edge of one of said frames and with one of said wall portions, said lower edge of said filter forming a liquid-impermeable joint with the lower edge of the other of said frames and with the other of said wall portions, and each of said side portions of said filter forming a liquid-impermeable joint with the side portion of said frames and with both of said wall portions whereby and upper and a lower compartment is formed within said envelope separated by said flexible filter element, said filter element providing the sole means for liquid passing between said compartments, said upper compartment having inlet means whereby said upper compartment receives liquid to be filtered and said lower compartment having outlet means to discharge filtered liquid.

2. The filtering device of claim 1 wherein said wall portions frames and said filter element are of heat-sealable polymeric sheet material and said liquid-impermeable joints are formed by heat sealing said sheet material.

3. The device of claim 1 wherein said polymeric material is an acrylic polymer and said resinous material is nylon.

* * * * *